United States Patent [19]

Haueter, Jr.

[11] Patent Number: 5,005,845
[45] Date of Patent: Apr. 9, 1991

[54] LOAD CARRYING POLE FOR OUTDOORSMEN

[76] Inventor: Donald F. Haueter, Jr., 1165 Lakewood La., Coos Bay, Oreg. 97420

[21] Appl. No.: 484,268

[22] Filed: Feb. 26, 1990

[51] Int. Cl.$^5$ ............................................. B62D 51/04
[52] U.S. Cl. .................................. 280/1.5; 190/18 A; 280/7.14; 280/47.3; 280/47.32
[58] Field of Search ................. 280/47.19, 47.3, 7.14, 280/78, 47.32, 1.5; 190/18 A; 224/907

[56] References Cited

U.S. PATENT DOCUMENTS

| | | | |
|---|---|---|---|
| 1,639,266 | 8/1927 | Moeller | 280/47.3 |
| 2,707,963 | 5/1955 | Goynes | 280/47.3 X |
| 2,806,711 | 9/1957 | Jacobs | 280/47.19 |
| 3,560,015 | 2/1971 | Tracy | 280/47.3 |
| 4,025,081 | 5/1977 | Bintz | 280/7.14 |
| 4,362,307 | 12/1982 | Nakatani | 280/30 |
| 4,593,841 | 2/1985 | Lange | 224/153 |

FOREIGN PATENT DOCUMENTS

| | | | |
|---|---|---|---|
| 48596 | 7/1918 | Sweden | 280/47.3 |
| 553294 | 5/1943 | United Kingdom | 280/47.3 |

*Primary Examiner*—David M. Mitchell
*Assistant Examiner*—Michael Mar
*Attorney, Agent, or Firm*—James D. Givnan, Jr.

[57] ABSTRACT

A pole member is supported by a ground engaging wheel with a load receiving, compartmented container located on the pole member adjacent the wheel. An upper end segment of the pole member is adjustably mounted for varying pole member length to suit the user. An article of outdoor gear may be carried by the pole upper end segment and enclosed by a cover. Forward motion is imparted to the device by the user's upper torso and arm with steering of the device by the user's hand. A ski may be substituted for the wheel.

6 Claims, 1 Drawing Sheet

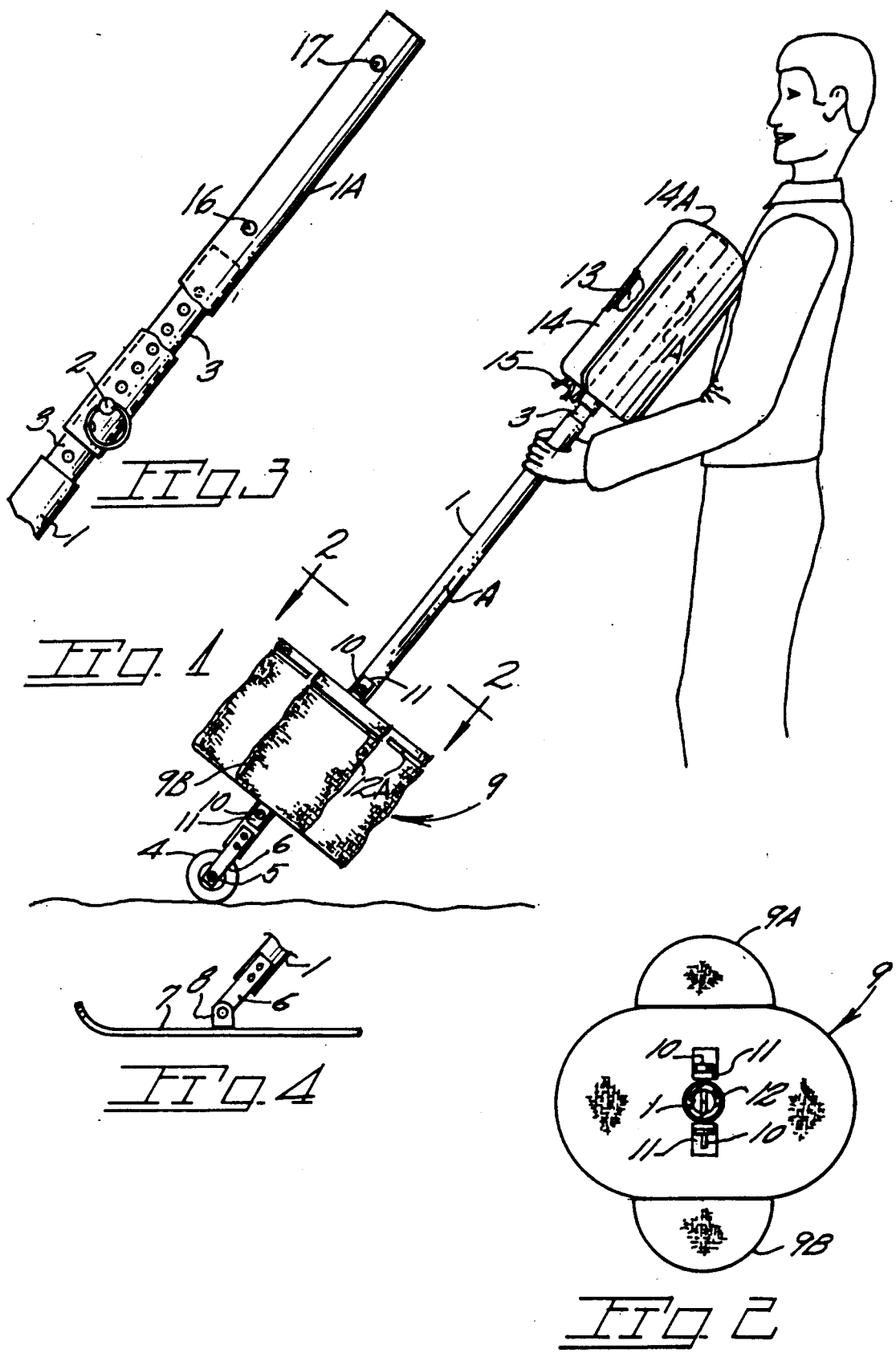

LOAD CARRYING POLE FOR OUTDOORSMEN

BACKGROUND OF THE INVENTION

The present invention pertains generally to load carrying equipment used by outdoorsmen and particularly to carriers for transporting camping gear and supplies.

Outdoorsmen, including hikers and hunters, typically carry backpacks or utilize pack animals. As there is a tendency to overload backpacks, outdoorsmen often encounter physical ailments during the course of a hiking venture. Further, the transporting of a heavy backpack incurs the risk of the hiker, with a high center of gravity, falling when transversing rough terrain.

U.S. Pat. No. 3,560,015 discloses a wheel supported pack carrier including a rectangular frame having a load receiving area permitting the transport of gear in wheelbarrow fashion. The frame structure of the carrier is of considerable size and requires the hiker to maneuver same with both hands when used in wheelbarrow fashion.

U.S. Pat. No. 4,593,841 discloses a wheel supported cart for transporting a hiker's pack with the cart convertible for use as a backpack. The cart is equipped with a strap for towing of the cart.

U.S. Pat. No. 4,362,307 discloses a cart for use by outdoorsmen which also provides optional modes of use i.e., as a cart or, with the wheels retracted, as a backpack.

The proposed gear transporting apparatuses do not provide a light-weight pole structure permitting transport of camping gear while supported by a single ground engaging member.

SUMMARY OF THE PRESENT INVENTION

The present invention is embodied within a pole structure fitted with gear attaching means and having a ground engaging member.

The gear transporting pole structure is adapted, adjacent its lower end, to receive a sizable volume of outdoor gear. Additionally, provision is made for transporting a small tent or sleeping bag rolled in place about the pole structure. When loaded, the pole structure has a low center of gravity for easy maneuvering by the hiker. Forward motion is imparted to the present pole by contact with the hiker's chest and upper arm. The lightweight nature of the present device permits convenient lifting of the device past obstructions encountered.

Important objectives of the present invention include the provision of a gear carrying pole device of lightweight construction utilizing an upright member provided with a ground engaging wheel for propelling or pulling along a trail by arm and shoulder effort; the provision of a gear carrying device permitting transport of a sizable quantity of outdoor gear at a low center of gravity superjacent a ground engaging wheel or a ski if used on the snow; the provision of a gear carrying device including a pole structure to which various articles may be mounted by means of a cover, as for example, a rolled tent or sleeping bag.

BRIEF DESCRIPTION OF THE DRAWINGS

In the accompanying drawings:

FIG. 1 is a side elevational view of the present gear device;

FIG. 2 is a horizontal sectional view taken along line 2—2 of FIG. 1;

FIG. 3 is an enlarged fragmentary elevational view of an upper end segment of the pole member with the load article shown in FIG. 1 removed; and FIG. 4 is a side elevational view of the lower end of the pole member fitted with a ski.

DETAILED DESCRIPTION OF THE PREFERRED EMBODIMENT

With continuing attention to the drawings wherein applied reference numerals indicate parts similarly hereinafter identified, the reference numeral 1 indicates a tubular pole member.

Preferably member 1 is segmented to provide an extensible segment at 1A with fasteners at 2 extending through selected, aligned openings in segment 1A and through an apertured internal sleeve 3 carried by the main member.

The lower end of member 1 carries a wheel 4 on an axle 5. For this purpose a pair of plates as at 6 may be suitably affixed to member 1. Ground enegaging wheel 4 may be removed and as shown in FIG. 4 a short ski 7 with a clevis at 8 substituted for traversing snow.

Load attaching means includes a gear container indicated generally at 9 and may, for the sake of convenience, include several compartments ofseet about the axis A of member 1. The container may be suitably attached to member 1 as by means of pins 10 extending through tabs 11 of the container. It has been found desirable to form container 9 with a central opening 12 extending downwardly therethrough to receive member 1 with the container disposed close to the ground for a low center of gravity with container weight being primarily on wheel 4. The compartments of the container including side compartments 9A-9B may be loaded so as to provide the desired weight distribution to suit the user's preference. Zipper closures are at 12A. Upper end segment 1A of pole member 1 may serve to carry a small tent which may be rolled about segment 1A to provide a cylindrical shaped load 13 enclosed by a cover 14 closed at its uppermost end 14A and having a drawstring closure 15 at its remaining or lower end. Accordingly, a rolled tent, or any other article of like configuration, may be carried in place by cover 14 as the end wall 14A is held in place by rested engagement with the upper end of the member segment 1A. Holes at 16 and 17 in an end segment 1A permit the tying of a carried article to the pole end segment if so desired.

In use, the device is propelled by the hiker's upper arm and chest with one hand in place on the main member to steer same. Directional control or steering is conveniently provided by slight manual rotation of the member about its axis to steer wheel 4. Member 1 accordingly also serves to provide a support or rest for the user's arm by switching from one arm to the other at intervals. Steering of the carrier is accomplished automatically and without effort after a short period of use.

With the present pole a person may transport outdoor gear with greater ease than with conventional methods. The pole is of lightweight construction to permit easy lifting or dragging over obstacles encountered along a trail.

While I have shown but one embodiment of the invention, it will be apparent to those skilled in the art that the invention may be embodied still otherwise without departing from the spirit and scope of the invention.

Having thus described the invention, what is desired to be secured by a Letters Patent is:

I claim:

1. A personal load transporting device adapted to be propelled by contact with the front of a user's upper torso, said device comprising:

a pole member having a main portion and a segmented portion attached to the upper end of said main portion in an axially adjustable manner, load carrying means on said pole member including a container with compartments disposed circumferentially about said main portion adjacent its lower end thereof, said container having a central opening through which said main portion is insertably received and a cover of bag construction for confining an article in place about said segmented portion, said cover being disposed circumferentially about said segmented portion and enclosing the upper end of said segmented portion; and a ground engaging wheel carried at the lower end of said main portion, wherein said pole member is adapted to be grasped intermediate its ends by the user's hand and held in an inclined position so as to locate the upper end of said pole member, with the cover disposed thereon, against the front of the user's torso.

2. The device claimed in claim 1 wherein said cover is a bag of elongate construction and having a drawstring closure at one end.

3. The device claimed in claim 1 additionally including pin means positioning said container on said main portion.

4. The device claimed in claim 3 wherein said container includes tabs adjacent said central opening for engagement with said pin means.

5. The device claimed in claim 1 wherein said container is of pliable material having zipper closures.

6. A personal load transporting device adapted to be propelled by contact with the front of a user's upper torso, said device comprising:

a pole member having a main portion and a segmented portion attached to the upper end of said main portion in an axially adjustable manner, load carrying means on said pole member including a container with compartments disposed circumferentially about said main portion adjacent it lower end thereof, said container having a central opening through which said main portion is insertably received and a cover of bag construction for confining an article in place about said segmented portion, said cover being disposed circumferentially about said segmented portion and enclosing the upper end of said segmented portion; and a ski carried at the lower end of said main portion, wherein said pole member is adapted to be grasped intermediate it ends by the user's hand and held in an inclined position so as to locate the upper end of said pole member, with the cover disposed thereon, against the front of the user's upper torso.

* * * * *